(12) United States Patent
Almási et al.

(10) Patent No.: US 10,359,687 B2
(45) Date of Patent: Jul. 23, 2019

(54) METHOD TO GENERATE TERAHERTZ RADIATION AND TERAHERTZ RADIATION SOURCE

(71) Applicant: Pécsi Tudományegyetem, Pécs (HU)

(72) Inventors: Gábor Almási, Kozármisleny (HU); József András Fülöp, Pécs (HU); János Hebling, Pécs (HU); Zoltán Ollmann, Pécs (HU); László Pálfalvi, Pécs (HU)

(73) Assignee: Pécsi Tudományegyetem, Pécs (HU)

( * ) Notice: Subject to any disclaimer, the term of this patent is extended or adjusted under 35 U.S.C. 154(b) by 0 days.

(21) Appl. No.: 15/763,180

(22) PCT Filed: Sep. 30, 2016

(86) PCT No.: PCT/HU2016/050046
§ 371 (c)(1),
(2) Date: Mar. 26, 2018

(87) PCT Pub. No.: WO2017/081501
PCT Pub. Date: May 18, 2017

(65) Prior Publication Data
US 2018/0292729 A1    Oct. 11, 2018

(30) Foreign Application Priority Data

Sep. 30, 2015 (HU) .................................. 1500448

(51) Int. Cl.
*G02F 1/35* (2006.01)
*G02F 1/355* (2006.01)

(52) U.S. Cl.
CPC .......... *G02F 1/3544* (2013.01); *G02F 1/3501* (2013.01); *G02F 1/3534* (2013.01);
(Continued)

(58) Field of Classification Search
CPC .... G02F 1/3501; G02F 1/3544; G02F 1/3551; G02F 2001/3503; G02F 2203/13; G02F 2202/20
See application file for complete search history.

(56) References Cited

U.S. PATENT DOCUMENTS 7,272,158 B1 *  9/2007  Hayes ................... G02F 1/365
                                                        372/21
8,564,875 B2 * 10/2013  Kawada ............... G02F 1/3534
                                                        250/504 R
(Continued)

FOREIGN PATENT DOCUMENTS

EP       2354841        8/2011
JP       2010139604     6/2010
(Continued)

OTHER PUBLICATIONS

Hoffmann, Matthias C. et al., "Efficient terahertz generation by optical rectification at 1035 nm," Opt. Express 15, 11706-11713 (2007).*
(Continued)

*Primary Examiner* — Daniel Petkovsek
(74) *Attorney, Agent, or Firm* — Fitch, Even, Tabin & Flannery LLP (57) ABSTRACT

The present application relates to generating terahertz radiation, wherein a pump pulse is subjected to pulse front tilting, the thus obtained pump pulse having tilted pulse front is coupled into a nonlinear optical medium and THz pulse is generated by the optical medium in nonlinear optical processes, particularly by means of optical rectification by the pump pulse. The application also relates to a terahertz radiation source (100), comprising a pump source (10) for emitting a pump pulse and a nonlinear optical medium for generating THz pulse. The pump source (10) and the nonlinear optical medium define together a light path, said light path
(Continued)

path is arranged to guide the pump pulse from the pump source (10) to the nonlinear optical medium. A first optical element (20) having angular-dispersion-inducing property and imaging optics (30) are disposed in the light path after each other in the propagation direction of the pump pulse.

23 Claims, 3 Drawing Sheets

(52) U.S. Cl.
CPC .... *G02F 1/3551* (2013.01); *G02F 2001/3503* (2013.01); *G02F 2202/20* (2013.01); *G02F 2203/13* (2013.01)

(56) References Cited

U.S. PATENT DOCUMENTS

| | | | |
|---|---|---|---|
| 9,024,260 B2 * | 5/2015 | Ouchi | G02F 1/3534 250/341.8 |
| 2013/0075629 A1 * | 3/2013 | Doi | G02F 1/3534 250/504 R |

FOREIGN PATENT DOCUMENTS

| | | |
|---|---|---|
| JP | 2014044365 | 3/2014 |
| WO | 2017081501 | 5/2017 |

OTHER PUBLICATIONS

Written Opinion of the International Searching Authority dated Jun. 6, 2017 for PCT/HU2016/050046; 5 pages.
International Search Report dated Jun. 6, 2017 for PCT/HU2016/050046; 4 pages.
Michael I. Bakunov et al, "Terahertz generation with tilted-front laser pulses in a contact-grating scheme"; Journal of the Optical Society of America—B., US, vol. 31, No. 11, Nov. 2014; 10 pages.
L. Pálfalvi et al, Hybrid tilted-pulse-front excitation scheme for efficient generation of high-energy terahertz pulses; Optics Express; vol. 24, No. 8, Apr. 6, 2016; 14 pages.
Hebling J. et al., "Velocity matching by pulse front tilting for large-area THz-pulse generation", Optics Express, (2002), vol. 10, No. 21; 6 pages.
H. Hirori et al., "Single-cycle terahertz pulses with amplitudes exceeding 1 MV/cm generated by optical rectification in LiNbO3", Applied Physics Letters, (2011), vol. 98, No. 9; 3 pages.
Blanchard et al., "Terahertz pulse generation from bulk GaAs by a tilted-pulse-front excitation at 1.8 μm", Applied Physics Letters, (2014), vol. 105; 5 pages.
J. Fülop et al., "Design of high-energy terahertz sources based on optical rectification", Optics Express, (2010), vol. 18, No. 12; 17 pages.
J. Fülop et al., "Design of high-energy terahertz sources based on optical rectification: erratum"; Optics Express, vol. 19, No. 23; Nov. 7, 2011; 1 page.
L. Palfalvi et al., "Novel setups, for extremely high power single-cycle terahertz pulse generation by optical rectification", Applied Physics Letters, (2008), vol. 92, No. 1; 4 pages.
A. Nagashima et al., "Design of Rectangular Transmission Gratings Fabricated in LiNbO3 for High-Power Terahertz-Wave Generation", Japanese Journal of Applied Physics, (2010), vol. 49; 6 pages.
A. Nagashima et al., "Design of Rectangular Transmission Gratings Fabricated in LiNbO3 for High-Power Terahertz-Wave Generation", Japanese Journal of Applied Physics-Erratum (2012) vol. 51; 2 pages.
Ollmann Z. et al., "Design of a contact grating setup for mJ-energy THz pulse generation by optical rectification", Applied Physics B, (2012), vol. 108, No. 4; 6 pages.
Ollmann Z. et al., "Design of a high-energy terahertz pulse source based on ZnTe contact grating", Optics Communications, (2014), No. 315; 5 pages.
M. Kunitski et al., "Optimization of single-cycle terahertz generation in LiNb03 for sub-50 femtosecond pump pulses", Optics Express, (2013), vol. 21, No. 6; 11 pages.
J. A. Fülöp et al., entitled "Efficient generation of THz pulses with 0.4 mJ energy"; Optics Express; vol. 22, issue 17, pp. 20155-20163, 2014; 9 pages.
Tsubouchi et al. published in the Conference Proceedings of the "41th International Conference on Infrared, Millimeter and Terahertz Waves (IRMMW-THz)" (Sep. 25-30, 2016) under the title of Compact device for intense THz light generation: Contact grating with Fabry-Perot resonator; 2 pages.
G.K. Abgaryan et al., entitled "Investigation of Parameters of Terahertz Pulses Generated in Single-Domain LiNbO3 Crystal by Step-Wise Phase Mask" (see Journal of Contemporary Physics (Armenian Academy of Siences), vol. 51, issue 1, pp. 35-40, 2016; 6 pages.
Ofori-Okai et al., entitled "THz generation using a reflective stair-step echelon" (see Optics Express, vol. 24, issue 5, pp. 5057-5067, 2016; 12 pages.
J. A. Fülöp et al. entitled "Design of high-energy terahertz sources based on optical rectification" (Optics Express, vol. 18., pp. 12311-12327, 2010; 17 pages.
Ollmann et al.; entitled Design of a Contact Grating Setup for mJ-Energy THz Pulse Generation by Optical Rectification; Applied Physics B Lasers and Optics; published online Sep. 23, 2012; 6 pages.

\* cited by examiner

METHOD TO GENERATE TERAHERTZ RADIATION AND TERAHERTZ RADIATION SOURCE

CROSS REFERENCE TO RELATED APPLICATIONS

This patent application is the national phase of PCT/HU2016/050046 filed Sep. 30, 2016, which claims the benefit of Hungarian Patent Application No. P1500448 filed Sep. 30, 2015.

TECHNICAL FIELD

The present invention relates to a method for generating terahertz (THz) radiation and a THz radiation source. In particular, the object of the present invention is a method and arrangement (the radiation source itself) to generate THz radiation via optical rectification in a nonlinear optical medium. In particular, the present invention is closely related to high energy THz radiation sources with tilted pulse front and a method to generate high energy THz radiation based on the tilted pulse front technique.

BACKGROUND

The use and thus the generation of THz pulses (particularly consisting of only a few optical cycles) having high energy and high field strength comes more and more into the front nowadays especially in the medical, security, nonlinear spectroscopy, particle manipulation and lots of other fields. Here, and from now on, the term 'THz radiation' refers to optical radiation in the far infrared domain with its main spectrum being in the frequency range of 0.1-10 THz.

Optical rectification of laser pulses having femtosecond (fs) pulse length in a nonlinear medium (e.g. in crystals having nonlinear optical properties) can be considered rather efficient methods for generating THz pulses having picosecond (ps) pulse length. Typically, ultrashort THz pulses (i.e. having a pulse length of several ps) may be generated by pump pulses in the visible or near infrared domain having pulse lengths of several hundred fs. As it is known, well defined phase matching conditions have to be satisfied for the occurrence of nonlinear phenomena, which in this case means a so-called velocity matching: the group velocity $v_{p;cs}$ of the pump pulse has to be equal to the phase velocity $v_{THz;f}$ of the generated THz pulse. If these velocities are close to each other in the medium having nonlinear optical properties, i.e. the group refractive index of the nonlinear medium at the frequency of the pumping does not differ by too much from the phase refractive index in the THz domain, this condition can be satisfied relatively easily—as it is known to a person skilled in the art. However, the efficiency of THz radiation generation is greatly affected by the second order nonlinear optical coefficient of the nonlinear medium. There are materials, whose nonlinear optical coefficient has a preferably high value, but due to the high value of the aforementioned refractive index difference, the velocity-matched THz radiation generation is an unsolvable technical problem. Lithium niobate $LiNbO_3$ (LN) is such a material with extraordinary high optical nonlinearity, in which the ratio of said refractive indices is greater than two.

In such cases, preferably the so-called tilted-pulse-front technique may be used (see the scientific publication of Hebling J. et al. entitled "*Velocity matching by pulse front tilting for large-area THz-pulse generation*" [Optics Express, 2002, vol. 10, issue 21, pages 1161-1166]. This is based on the fact that generation of THz radiation takes place by means of a light pulse in which the pulse front (intensity front) forms a required angle ($\gamma$) with the wave front (phase front). As the generated THz beam propagates perpendicularly to the tilted pulse front, as a consequence of the phase matching condition, the projection of the group velocity vector of pumping onto the direction of the propagation direction of the THz radiation has to be equal to the phase velocity of the THz beam, i.e. the $$v_{p;cs} \cos(\gamma) = v_{THz;f}$$

relation has to be satisfied.

In a widespread technical implementation of the tilted-pulse-front technique, the pulse front tilt of a beam of the pump source is induced by diffracting said beam on an (mostly reflective) optical grating. Then the diffracted beam is guided through an optical lens or telescope (i.e. an imaging optics) directly into the nonlinear crystal (e.g. LN) to generate THz radiation in such a manner, that the image of the beam spot appearing on the surface of the optical grating is imaged into the crystal by the lens or telescope, wherein the desired THz radiation is generated as a result of the nonlinear phenomena. The pump pulse is guided onto the entry plane of the crystal mostly/preferably perpendicularly, thus in order to minimize reflection losses, the exit plane and the entry plane of the crystal have to be oriented at an angle $\gamma$ relative to each other, i.e. the optical medium substantially forms an optical prism to ensure a perpendicular exit of the THz beam from the crystal. The magnitude of angle $\gamma$ is material specific, thus its value is explicitly determined based on the crystal to be used. That is, in particular, in the case of LN said value is $\gamma \approx 63°$.

Nowadays, the tilted-pulse-front technique substantially is a routine method for generating THz radiation, in the last decade, using LN crystal, an increase of about seven magnitudes has been achieved with this technique in the energy of quasi single cycle THz pulses. The pulse front tilting by a diffraction element, and the transformation on imaging optics disposed after the dispersive element is discussed in numerous publications in the literature, for example—without completeness—the work of H. Hirori et al. entitled "*Single-cycle terahertz pulses with amplitudes exceeding 1 MV/cm generated by optical rectification in LiNbO(3)*" [see Applied Physics Letters, 2011, vol. 98, issue 9, page 3] that uses LN crystal as nonlinear optical medium or the publication of Blanchard et al. entitled "*Terahertz pulse generation from bulk GaAs by a tilted-pulse-front excitation at 1.8 µm*" [see Applied Physics Letters, 2014, vol. 105, page 241106], which uses gallium-arsenide crystal with plane parallel structure as nonlinear optical medium. A method for THz radiation generation by the tilted-pulse-front technique is further discussed in the European patent no. EP-2,354,841 B1, which discusses a method and device for THz radiation generation based on optical rectification, carried out by a tilted-pulse-front pump pulse, wherein said pump pulse is guided onto a transmissive or reflective grating where it is diffracted and thus its pulse front is tilted, then this pulse is imaged into a suitable nonlinear crystal, e.g. LN crystal, by an imaging optical system.

The imaging errors (e.g. different types of aberrations) of the imaging optics in the case of tilted-pulse-front THz generation arrangements having imaging optics cause distortion of the pump pulses in the nonlinear medium, namely local pulse length widening, which effect increases by the distance from the optical axis. As one of the important factors determining the efficiency of THz radiation generation is the pulse length of the pump pulse, these imaging errors cause a significant efficiency decrease. Due to the limited optical damage threshold of materials, the increase of the pump energy necessarily leads to the increase of the beam diameter. However in the case of large diameter (i.e. wide) pump beams said pulse length widening causes significant decrease in the efficiency of THz radiation generation.

Thus, the imaging optics is disadvantageous from the point of view of tilted pulse front THz generation arrangements comprising it, because it decreases the efficiency of THz radiation generation at large pump energies, and thus it significantly limits the feasibility of large energy THz radiation generation carried out by the tilted-pulse-front technique, and thus the achievable energy of THz radiation generated thereby.

In recent years, study of imaging optics forming substantial parts of the tilted-pulse-front technique has been the object of numerous studies. For example the publication of J. Fülöp et al. entitled "*Design of high-energy terahertz sources based on optical rectification*" [see Optics Express, 2010, vol. 18, issue 12, pages 12311-12327] discusses a THz radiation generation arrangement, which is based on the combination of an optical grating (as spectral dispersive element) and a special imaging optics (a collecting lens). The essence of the arrangement is that the pulse front tilt satisfying the velocity matching condition required for coupling in the pump pulse into the nonlinear optical medium that is required for the THz radiation generation is achieved in a single step on an optical grating disposed in the propagation path of the pump pulse, i.e. in the light path, before the imaging optics.

Said scientific publication also provides a detailed guide for the optimal construction of an optical imaging arrangement implemented with the lens. Accordingly, efficient THz radiation generation requires that (i) the pulse front tilt in the crystal is as large as required by the velocity matching condition (e.g. about 63° in the case of LN), and (ii) in order to minimize the effect of imaging errors on the efficiency of THz radiation generation, the pump pulse length along the tilted pulse front in the nonlinear optical medium is as close to the transformation-limited value as possible. In order to satisfy this, the image of the beam spot appearing on the optical grating created in the crystal has to contact the tilted-pulse-front surface along the optical axis.

The imaging errors unique for imaging optics and thus the drawbacks of using imagining optics, however, have not been solved completely.

A further widespread method for THz radiation generation is—besides the tilted-pulse-front THz generation arrangements having imaging optics—the so called contact grating arrangement (see the scientific publication of L. Pálfalvi et al. entitled "*Novel setups for extremely high power single-cycle terahertz pulse generation by optical rectification*" [Applied Physics Letters, 2008, vol. 92, issue 1, pages 171107-171109]). A characteristic feature of these is that pulse front tilt of the pump beam is achieved on a single optical element having angular-dispersion-inducing property formed in the surface of the nonlinear optical medium (e.g. by etching), preferably by a single step of diffraction on a single transmissive optical grating. The period (or line-density) of the optical grating that is necessary for this is determined by the material of the nonlinear crystal and the emission wavelength of the pump source. The primary parameters limiting the size of the pump beam in the contact grating arrangement is the damage threshold of the material and the dimensional constraints of the crystal growing, therefore particularly large energy pumping (i.e. by a wide beam) can be achieved.

In recent years, THz radiation generation by the contact-grating arrangement has become also a subject of numerous scientific publications; thus the optimal design and practical implementations of suitable contact gratings are discussed relatively widely. As a result of said studies, further factors limiting the use of the contact grating arrangement became apparent.

For example, the work of A. Nagashima et al. entitled "*Design of Rectangular Transmission Gratings Fabricated in LiNbO$_3$ for High Power Terahertz-Wave Generation*" [see Japanese Journal of Applied Physics, 2010, vol. 49, page 122504-1] and the publication of A. Nagashima et al. entitled "*Erratum: Design of Rectangular Transmission Gratings Fabricated in LiNbO$_3$ for High-Power Terahertz-Wave Generation*" [see Japanese Journal of Applied Physics, 2012, vol. 51, page 119201-1] extensively study the theoretical modeling of the contact grating to be formed in the surface of a LN crystal. Taking a binary grating profile as a basis (see FIG. 1) the diffraction efficiency of the contact grating was optimized as a function of the lattice constant ($d_2$), the filling factor (f=w/d, here w is the profile width) and the profile depth (h). They came to the conclusion that it was practical to use an intermediate material, in particular, fused silica on the air/LN boundary surface in order to improve the efficiency of only 20% achievable with optimal lattice constant ($d_2$=0.42 μm, line-density of 2380/mm) in the case of an air/LN contact grating setup. According to their theoretical calculations, a diffraction efficiency of 90% may be achieved with the air/fused silica/LN contact grating structure at the optimal lattice constant ($d_2$=0.36 μm, line-density of 2777/mm). As the problem of applying silica on the submicron sized structure of the LN surface is not solved nowadays, the technical/practical implementation of the theoretically obtained structure would be quite difficult, if possible at all.

A possible solution for this technical problem is using a refractive index matching liquid (RIML) on the air/LN crystal boundary surface, as suggested in the work of Ollmann Z. et al. entitled "*Design of a contact grating setup for mJ-energy THz pulse generation by optical rectification*" [see Applied Physics B, 2012, vol. 108, issue 4, pages 821-826]. This publication discusses the details of coupling in and out of an LN crystal in a contact grating arrangement in the case of numerous possible RIML materials, and the effects of dispersion during propagation through the crystal; in particular, a diffraction efficiency of 98% is predicted for a RIML material with a refractive index equivalent to that of e.g. a type BK7 glass comprising a grating with a lattice constant of 0.35 μm (i.e. line-density of 2874/mm).

However, studies regarding the formation of contact-gratings in the surface of nonlinear optical media, and thus particularly of LN crystals, show that the crystal surfaces can only be machined only up to a certain (material dependent) line-density limit. In particular, if the line-density is above this limit, the profile of the created grating becomes blurred. This causes the actual diffraction efficiency of the grating in typical pump beam wavelengths to fall far below the theoretical predictions, because the diffraction efficiency of the grating is very sensitive to the formed grating profile. According to our studies, this limit in the cases of e.g. LN or LiTaO$_3$ (lithium tantalate) is about 2000/mm for pump beam wavelength of 1030 nm. According to our experimental results, the grating geometries with line densities of 2500-3000 l/mm predicting the promising efficiencies described in the aforementioned publications cannot be practically implemented to achieve the theoretically predicted efficiencies with the methods available nowadays (e.g. reactive ion etching, lithographic methods, ablation techniques, etc.).

Accordingly, the THz radiation generation solutions based on a contact grating are not sufficient for high energy THz radiation generation in themselves, because machining difficulties prevent the formation of good quality grating profiles in cases wherein formation of a grating with high line-density would be necessary.

It should be here further noted, that tilted-pulse-front THz generation arrangements comprising imaging optics and contact grating based THz generation arrangements have been extensively studied and compared with each other in literature as independent solutions providing alternative generating schemes mutually excluding each other. In particular, the publication of M. Kunitski et al. entitled "*Optimization of single-cycle terahertz generation in LiNbO$_3$ for sub-50 femtosecond pump pulses*" [see Optics Express, 2013, vol. 21, issue 6, pages 6826-6836] compare LN crystal based arrangements for THz radiation generation by tilted pulse front pump pulses. The paper discusses four conventional arrangements with optical grating and imaging optics (with lens, refracting telescope, mirror, reflecting telescope), whose efficacy is compared with each other and with a contact grating arrangement on the basis of model calculations. Optical errors of different optical imaging systems are studied and described in great detail. Based on the result of the comparison, a ranking is established among said arrangements, wherein the contact grating arrangement and the conventional arrangement are considered to be mutually exclusive solutions.

By comparing the advantages and disadvantages of tilted-pulse-front techniques, namely the arrangements comprising imaging optics (from now on, conventional arrangements) and the contact grating based arrangements, we have came to the conclusion, that grating profiles obtained by manufacturing methods available nowadays can be made suitable to provide diffraction efficiencies as predicted by theoretical calculations (but only at significantly greater line densities). According to our studies, this requires the tilting of the pulse front of the pump pulses to the extent required by the velocity matching condition in more than one step, as a series of partial pulse front tilts or, putting this another way, as a sum of pulse front tilts created separately from each other. That is, the pump pulses have to be subjected to pulse front tilting (pre-tilting) before their incidence on the contact grating, which may be carried out by e.g. a combination of an angular-dispersive element and an imaging optics used e.g. in conventional techniques. According to our studies, the pulse front tilt of pump pulses required to satisfy the velocity matching condition is preferably achieved by at least two optical elements with angular-dispersion-inducing property spatially separated from each other (in the light path) instead of a single optical element with angular-dispersion-inducing properties.

SUMMARY

In light of the aforementioned, an object of the present invention is to provide a hybrid tilted-pulse-front THz generation arrangement by combining the tilted-pulse-front THz generation arrangement comprising imaging optics and the THz generation arrangement with a contact grating, which significantly reduces or eliminates the disadvantages of the aforementioned prior art solutions.

A further object of the present invention is to provide a method and radiation source for generating high energy THz radiation, i.e. in the mJ domain, particularly with using materials characterized by high nonlinear optical coefficient, such as LN, as nonlinear optical medium.

A yet further object of the present invention is to provide a method and radiation source for generating high energy THz radiation, wherein the distortion of the beam profile of the generated THz radiation may also be moderated.

In the case of a tilted-pulse-front hybrid generation arrangement comprising both an imaging optics and a contact grating arrangement, and in the case of a high-energy THz radiation source according to the arrangement:

on the one hand, contact grating can be used for materials exploited in THz radiation generation with nonlinear optical properties (and thus for LN), wherein achieving high diffraction efficiency would require line densities that would cause technical problems and would not technologically be implementable, on the other hand, as the extent of pre-tilting of the pulse front may be much less than what would be necessary in an arrangement based only on the combination of an optical grating and an imaging optics, the influence of the imaging errors on the local pulse length is significantly reduced that is highly beneficial to the efficiency of THz radiation generation.

In particular, in a preferred embodiment of the hybrid generation arrangement according to the invention, the grating formed in the surface of the material having nonlinear optical properties has significantly lower line-density than in arrangements comprising only a contact grating, thus the (contact)grating required for pump pulses to be coupled into the material having nonlinear optical properties may be formed as a high quality optical grating regarding its fine structure.

The hybrid generation arrangement according to the invention has the further advantage that to achieve a high diffraction efficiency, where no use of a refractive index matching liquid is required.

A further advantage of the hybrid generation arrangement according to the invention is that dividing the pulse front tilt of the pump pulses necessary for satisfying the velocity matching condition to two or more separate steps results in the reduction of the angle formed between the entry—and exit plane of the optical medium used for THz radiation generation. That is especially advantageous in the case of THz beams having large transversal dimensions because this may reduce distortion of the exiting beam profile due to the smaller dispersion of the beam parts closer to the edges. Therefore, it is possible to improve the quality of the THz beam.

Arrangements having imaging optics and arrangements having a contact grating, and the advantages/disadvantages thereof are known from the literature dealing with the development of THz radiation sources. The combination of the two methods and the creation of a single so-called hybrid arrangement having both imaging optics and contact grating is not known from the literature and there is not even a hint thereto—as far as we know—, moreover, as mentioned previously, these two solutions are considered and used only as alternatives of each other in the art.

BRIEF DESCRIPTION OF DRAWINGS

In what follows, the invention is described in detail with reference to the accompanying drawings, wherein.

DETAILED DESCRIPTION

Figure 2:
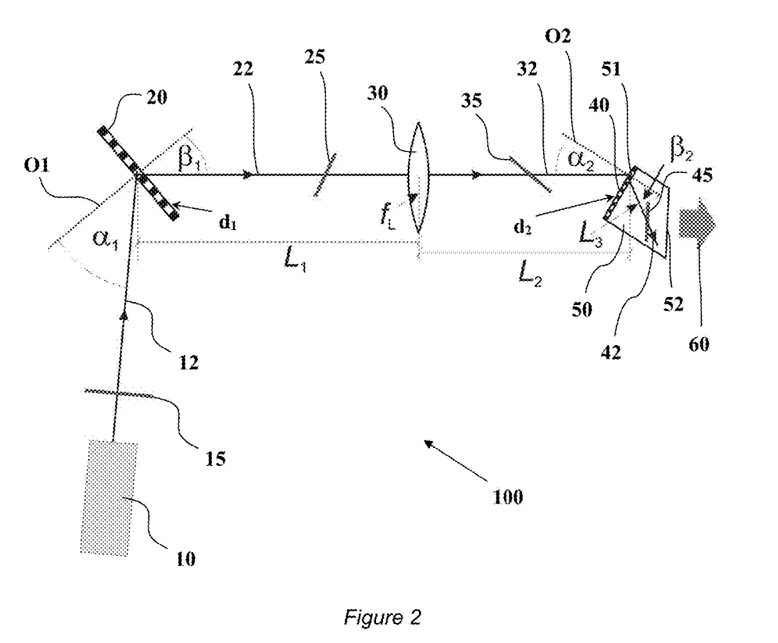
FIG. 2 shows schematically a preferred embodiment of the THz radiation source implementing a hybrid generation arrangement according to the invention with an angular-dispersive optical element formed by a transmission optical grating disposed in the light path before (i.e. upstream of) the imaging optics and a contact grating arranged after (i.e. downstream of) the imaging optics resulting in pulse front tilt of the pump beam is more than one separate steps.

The so-called hybrid tilted-pulse-front THz beam generation arrangement according to the invention, and a preferred embodiment of the THz radiation source 100 for generating THz radiation are illustrated in FIG. 2. The radiation source 100 comprises a pump source 10 for providing a pump beam 12, and an optical element 50 having nonlinear optical properties for generating THz radiation 60. The optical element 50 has an exit plane 52 and an opposing entry plane 51, which forms a predetermined angle with the exit plane 52; therefore the optical element 50 is preferably formed as a prism or optical wedge. The THz radiation 60 is generated as a result of the nonlinear optical interaction of the material of the optical element 50 and the pump beam 12, preferably by optical rectification, in the volume of the optical element 50 substantially at a distance $L_3$ from the entry plane 51, then it leaves the optical element 50 through its exit plane 52 and then it may be subjected to further use. A contact grating 40 characterized by predetermined geometrical parameters is arranged on the entry plane 51 in perfect optical coupling with said entry plane 51 or formed in the entry plane 51. In practice, the contact grating 40 is formed by an optical grating having an optical axis O2 and a lattice constant dz, wherein the optical axis O2 is substantially perpendicular to the entry plane 51.

The pump source 10 and the optical element 50—as an initial element and a final element—together define a light path extending between the emission point of the pump source 10 and the entry plane 51. The radiation source 100 comprises in said light path, in the propagation direction of the pump beam 12, i.e. toward the entry plane 51 respectively a first optical element having angular dispersion inducing property, i.e. an angular-dispersive optical element 20 and an imaging optics 30 in a predetermined geometrical arrangement; the optical element 20 and the imaging optics 30 are located at a mutual distance $L_1$ along the light path, while the imaging optics 30 and the contact grating 40 are arranged at a mutual distance $L_2$. Determining the geometric parameters comprising the distances $L_1$, $L_2$ and $L_3$ is described in detail in the following.

The pump source 10 is preferably a laser source suitable to produce laser pulses—the pump beam 12—in the visible, near- or mid-infrared domain with a pulse length of several hundred fs, e.g. a diode pumped Yb laser with a central emission wavelength of 1030 nm. However, different lasers may also be used as pump source 10.

The optical element 20 is formed as an optical element inducing the dispersion of the pump beam 12 incident thereon and transmitted therethrough, and thus changing the tilt of the initial pulse front 15 (characterized by preferably zero tilt) of the pump beam 12 by a predetermined amount. The angular-dispersive optical element 20 may be provided by a diffraction based optical element (preferably optical grating) or by a refraction based optical element (preferably a prism/prisms) or by a combination thereof (e.g. a prism combined with a diffraction grating, i.e. a so-called grism). In the embodiment of the radiation source 100 illustrated in FIG. 2, the optical element 20 is preferably a transmissive grating having an optical axis O1 and a lattice constant $d_1$, however—as it is obvious to a person skilled in the art—it may also be provided by other angular-dispersive optical elements, e.g. a reflective grating, prism, etc. The advantage of constructing it as a transmission grating is the relatively high separation of the incident pump pulse 12 and the beam 22 diffracted e.g. in the first order. In this case, the pump beam 12 incident in an angle $\alpha_1$ relative to the optical axis O1 on the optical element 20 provided in the form of a transmission grating is diffracted in an angle $\beta_1$ and transmitted in the light path as the beam 22, wherein the pulse front 25 of the beam 22 has a certain extent of tilt; the extent of tilt is explicitly determined by the wavelength $\lambda$ of the pump beam 12, the lattice constant $d_1$ and the angle of incidence $\alpha_1$ through the following relations:

$$\sin(\alpha_1) = \frac{\lambda}{d_1} - \sin(\beta_1) \quad (1)$$

$$\frac{d\beta_1}{d\lambda} = -\frac{1}{d_1 \cos(\beta_1)} \quad (2)$$

$$\tan(\gamma_1) = -\lambda \frac{d\beta_1}{d\lambda} \quad (3)$$

As it is known to a person skilled in the art, the tilt of the pulse front 25 may be derived through similar relations when different types of angular-dispersive optical elements 20 are used.

The imaging optics 30 may be provided by any imaging optics known from the field of conventional tilted-pulse-front THz generation arrangements having imaging optics. Thus, for example the imaging optics 30 may be provided in the form of a lens, refracting telescope, mirrors, reflecting telescope, or a concave mirror or in the case of a reflecting telescope, the telescope having concave mirrors may be formed by both spherical and cylindrical mirrors. Any of said optical elements used for the imaging optics 30, may be formed with spherical shape, cylindrical shape or a shape with minimized imaging error ('bestform'). In the embodiment of the radiation source 100 illustrated in FIG. 2, the imaging optics 30 is provided in the form of a focusing lens having a certain diameter and a focal length $f_L$ (e.g. $f_L$=200 mm). The imaging optics 30 images the (in this case) diffracted beam 22 having a pre-tilted pulse front 25 into the optical element 50 as a beam 32 having a pulse front 35. In particular, in this embodiment of the radiation source 100, the beam 22 is guided by the imaging optics 30—in the form of beam 32 at an angle $\alpha_2$ relative to the optical axis O2—to a further optical element with angular-dispersion-inducing property, in particular, to a contact grating 40 and after being diffracted it is introduced into the volume of the optical element 50 in the form of beam 42. The pulse front 45 of the beam 42 is tilted to the extent required by the phase matching condition. The tilted-pulse-front beam 42 propagates in the optical element 50 at angle $\beta_2$ to the normal of the crystal lattice. The phase fronts of the generated THz radiation 60 are parallel to the tilted pulse front 45, thus the propagation direction of the THz radiation 60 is necessarily perpendicular to these planes.

Figure 1:
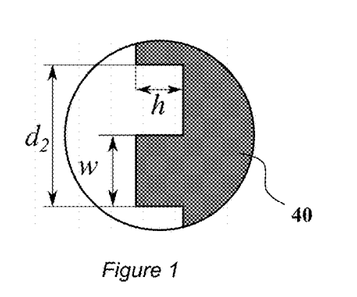
FIG. 1 illustrates—in an enlarged view—the characteristic parameters of the grating profile of a contact grating with a binary grating profile that represents a preferred embodiment of the contact grating that can be used as the optical element with angular-dispersion-inducing property in the hybrid generation arrangement according to the invention.

The contact grating 40 is preferably provided as an optical grating having a grating profile illustrated in FIG. 1 i.e. a so-called binary grating profile. It is known to a person skilled in the art, that the contact grating may be implemented with different grating profiles (e.g. sinusoidal, sawtooth etc.), further preferred exemplary grating profiles may be known from the scientific publication of Ollmann Z. et al. entitled "*Design of a high-energy terahertz pulse source based on ZnTe contact grating*" [Optics Communication, 2014, issue 315, pages 159-163].

The optical element 50 is made of a material having an outstandingly high nonlinear optical coefficient, practically at least 1 pm/V, and having different refractive indices in the terahertz and the visible domain, preferably LN or lithium-tantalate, preferably with a crystal-axis orientation that facilitates the occurrence of nonlinear optical phenomena, thus aiding e.g. the occurrence of optical rectification and thus the generation of THz radiation. Moreover, in order to minimize reflection losses, the exit plane 52 of the optical element 50 is formed to emit the THz radiation 60 generated in the optical element 50 through the exit plane 52 of the optical element 50 perpendicularly.

As mentioned previously, the geometric parameters (see FIG. 2) characterizing the geometric arrangement of the elements forming parts of the radiation source 100 may be obtained by optimization. The optimization is based on the following conditions of efficient THz radiation generation:
the summed tilt of the pulse front 45 of the beam 42 satisfies the velocity matching condition;
in order to minimize the effect of the imaging errors on the efficiency of THz beam generation, the pulse length of the pump pulse along the pulse front 45 inside the optical element 50 is as close to the transformation-limited value as possible, i.e. the image of the beam spot of the beam 22 appearing on the angular-dispersive optical element 20 in the optical element 50 contacts the tilted-pulse-front surface along the optical axis.

Without showing detailed mathematical deductions (which are obvious to a person skilled in the art), the general equations for the selection of the angular-dispersive optical element 20 and the imaging optics 30, and for determining the geometry of the radiation source 100 after fixing the grating profile of the contact grating 40 are summarized in the following. Accordingly:

$$\sin(\alpha_1) = \frac{\lambda}{d_1} - \sin(\beta_1) \tag{4}$$

$$\sin(\beta_1) = a \frac{\lambda}{d_1 n n_g} k \tag{5}$$

$$L_1 = f_L(\sqrt{a} + 1) \tag{6}$$

$$L_2 = \frac{f_L L_1}{L_1 - f_L} - \frac{L_3}{n} \frac{\cos^2(\alpha_2)}{\cos^2(\beta_2)}, \tag{7}$$

wherein parameters $a$ and $k$ satisfy the $$a = \sqrt{\frac{\lambda^2}{d_1^2 \tan^4(\gamma_0)} + \frac{4k^2}{n^2 n_g^2}} \cdot \frac{d_1 n^2 n_g^2}{2\lambda k^2} - \frac{n^2 n_g^2}{2\tan^2(\gamma_0) k^2}, \tag{8}$$

$$k = \frac{\cos(\alpha_2)}{\cos(\beta_2)} \frac{\tan(\gamma)}{\tan(\gamma_0)} n_g \tag{9}$$

relations, and wherein the parameters are summarized in the following Table 1.

TABLE 1 description of parameters used in equations (1) to (10).

| | | | |
|---|---|---|---|
| $\lambda$ | central wavelength of the pump source 10 | $\alpha_1$ | angle of incidence at the optical grating forming the angular-dispersive optical element 20 |
| $f_L$ | focal length of the lens forming the imaging optics 30 | $\beta_1$ | diffraction angle at the optical grating forming the angular-dispersive optical element 20 |
| $\gamma$ | required extent of pulse front tilt inside the optical element 50 | $\alpha_2$ | angle of incidence at the contact grating 40 |
| $\gamma_0$ | extent of pulse front pre-tilting (initial/partial tilt of the pulse front) | $\beta_2$ | diffraction angle at the contact grating 40 |
| n | refractive index of the optical element 50 | $L_1$ | relative distance of the angular-dispersive optical element 20 and the imaging optics 30 |
| $n_g$ | group refractive index of the optical element 50 | $L_2$ | distance of the imaging optics 30 and the contact grating 40 |
| $d_1$ | lattice constant of the optical grating forming the angular-dispersive element 20 | $L_3$ | distance of intensive THz radiation generation inside the optical element 50 from the entry plane 51 thereof |

Assuming real physical parameters, the results of (analytic) calculations carried out on the basis of a system of equations comprising the aforementioned equations (4) to (9) determine explicitly the geometric parameters of the hybrid generation arrangement according to the invention (i.e. of the radiation source 100).

Parameters $\lambda$, $f_L$, $\gamma$, n, $n_g$, $d_1$, $L_3$ are determined and/or chosen and/or preset by the user through the selection of the pump source and/or the material of the nonlinear optical medium to be used for the THz radiation generation.

The extent of pre-tilting of the pulse front of the pump beam 10 (i.e. the first part of pulse front tilting) is selected so that the tangents of the angles characterizing the subsequent (two) steps of inducing pulse front tilts are about the same, i.e.

$$tg(\gamma_0) = \frac{\tan(\gamma)}{2}. \tag{10}$$

It is hereby noted, that the energy of the generated THz pulse is primarily determined (when using—among others—a pump pulse with a given transformation-limited pulse length) by the changes in pulse length originating from the imaging errors of the imaging optics 30 and occurring in the optical element 50, and the diffraction efficiency on the contact grating 40 formed in the entry plane 52 of the optical element 50. Accordingly, as the result of the efficiency-optimization carried out for the contact grating 40, the parameters $\alpha_2$, $\beta_2$, $d_2$ become fixed.

The remaining (free) parameters, i.e. $\alpha_1$, $\beta_1$, $L_1$, $L_2$ characterize the geometric relations of the hybrid THz generation arrangement according to the invention.

EXAMPLE

The tilted-pulse-front hybrid generation arrangement according to the invention is described in detail in the following with the exemplary use of LN crystal as the nonlinear optical medium. The use of LN crystal may be considered special, because this material has outstanding nonlinear properties, but it can only be machined without the deterioration of the profile quality of the grating to be formed in its surface for the widely used (about 1030 nm) pump beam wavelength to a line-density of at most about 2000/mm. Therefore, the use of the hybrid generation arrangement according to the invention is particularly advantageous in its case. However, the method—with the necessary modifications obvious to a person skilled in the art—may naturally be used in the case of any other material, wherein tilted-pulse-front pumping is required and implementing a solution with merely a contact grating is problematic.

In this case, the grating profile of the contact grating is the same as the binary grating profile shown in FIG. 1, a transmissive optical grating is used as the angular-dispersive optical element, and the imaging optics is formed in this case by a (preferably focusing) lens. The extent of pulse front tilt induced by the transmissive optical grating may be simply obtained on the basis of the aforementioned equations (1) to (3) and (10).

In order to ensure efficient THz beam generation, the aforementioned conditions are satisfied, i.e.

the summed pulse front tilt of the pump beam satisfies the velocity matching condition, i.e. it is about 63° in the case of LN;

in order to minimize the effect of the imaging errors on the efficiency of THz beam generation, the pulse length of the pumping along the pulse front in LN crystal is as close to the transformation-limited value as possible, i.e. practically the image of the beam spot appearing on the transmissive optical grating having lattice constant $d_1$ in the crystal is in contact with the tilted-pulse-front surface along the optical axis.

Under these conditions, the geometric parameters obtained by analytic calculations for LN crystal through the aforementioned equations (4) to (9) may be explicitly derived after setting the values of the parameters to be fixed (LN crystal, 1030 nm pump wavelength, etc.).

Figure 3:
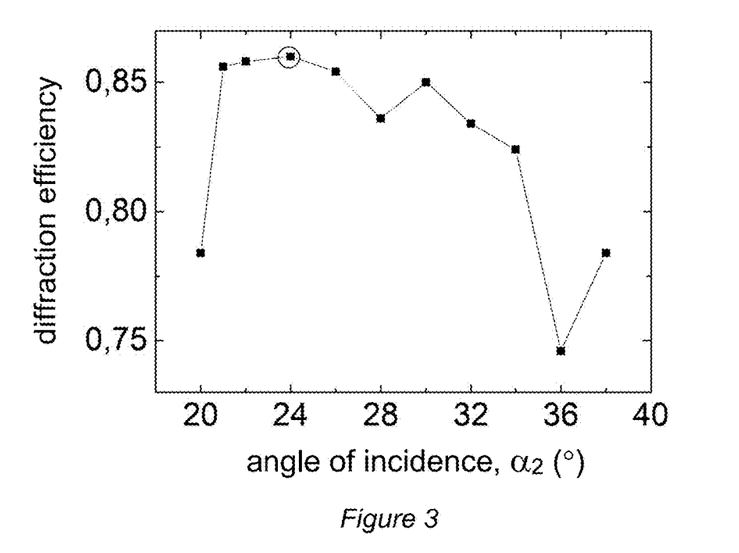
FIG. 3 shows the diffraction efficiency of a contact grating used in the hybrid generation arrangement according to the invention formed in the surface, in particular, of an LN crystal with a grating profile as illustrated in FIG. 1 as a function of the incidence angle ($\alpha_2$) of the pump beam having a tilted pulse front, with the geometric parameters summarized in Table 2.

Accordingly, the diffraction efficiency for the contact grating with a lattice constant of $d_2$ of the hybrid generation arrangement constructed in an optimal manner regarding the optical imaging is illustrated in FIG. 3 as a function of the incidence angle $\alpha_2$ of the pump beam having a pre-tilted pulse front, without the use of RIML and with the LN contact grating cooled to 100K. The diffraction efficiency is shown as a function of the incidence angle $\alpha_2$ with a lattice constant chosen for each value that ensures the required extent of pulse front tilt in the LN crystal, and with an equal extent of pre-tilting (65° in air). According to the figure, the diffraction efficiency exceeds 85% in the range between 21° and 26°, the angle of incidence corresponding to the flat maximum is $\alpha_2=24°$. From now on, the hybrid generation arrangement with the geometry corresponding to this point is considered optimal and discussed further.

For comparison purposes, Table 2 below summarizes the parameters of three different generation arrangements based on the tilted-pulse-front technique. That is, the characteristic parameters of the hybrid arrangement, the conventional generation arrangement optimized as described in the scientific publication of Fülöp J. et al. entitled "*Design of high-energy terahertz sources based on optical rectification*" [Optics Express, 2011, vol. 18, issue 12, pages 12311-12327], and the contact grating generation arrangement optimized as described in the scientific publication of Ollmann Z. et al. entitled "*Design of a contact grating setup for mJ-energy THz pulse generation by optical rectification*" [Applied Physics B, 2012, vol. 108, issue 4, pages 821-826].

TABLE 2

Characteristic geometric parameters for different types of generation arrangements in the case of using an LN crystal, assuming an optimal incidence angle $\alpha_2$.

| generation arrangement | pump wavelength | pump pulse length | $1/d_1$ | $1/d_2$ | lens $f_L$ | $\alpha_1$ | $\alpha_2$ | $\beta_2$ |
|---|---|---|---|---|---|---|---|---|
| hybrid | 1030 nm | 200 fs | 1400/mm | 1563/mm | 200 mm | 46° | 24° | 34° |
| conventional | 1030 nm | 200 fs | 1400/mm | — | 200 mm | 37° | — | — |
| contact grating | 1030 nm | 200 fs | — | 2874/mm | — | — | 70° | 46° |

At a given lattice constant, the diffraction efficiency depends on the parameters characterizing the structure of the grating profile; in the case of the selected square grating having binary grating profile these are the filling factor $f=w/d_2$ and the profile depth h (see also FIG. 1)

Figure 4:
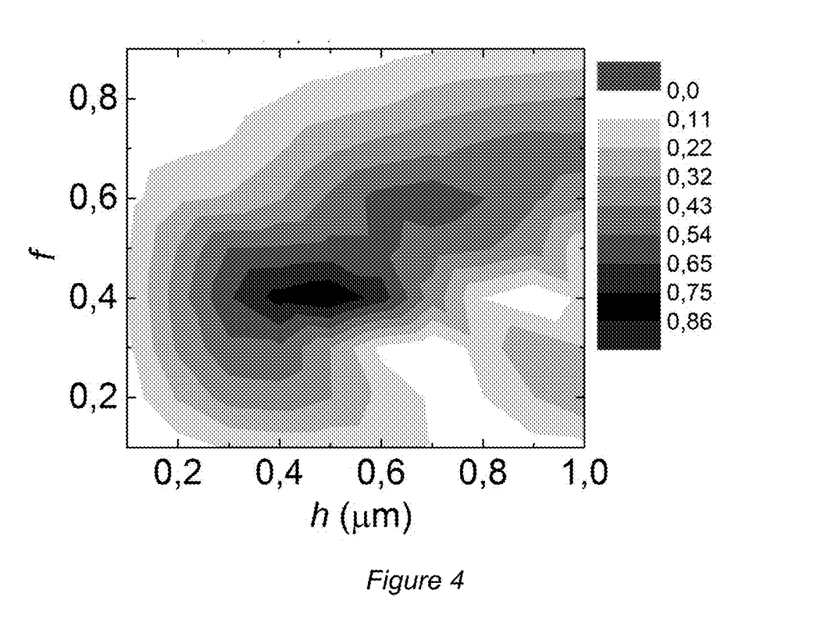
FIG. 4 shows the diffraction efficiency of a contact grating formed in the surface, in particular, of an LN crystal with a grating profile as illustrated in FIG. 1 used in the hybrid generation arrangement according to the invention as a function of the filling factor (f=w/$d_2$) and the profile depth (h)

FIG. 4 illustrates the diffraction efficiency as a function of the filling factor f and the profile depth h on the entry plane of the LN crystal in the case of a square grating having binary grating profile in harmony with the parameters in the 'hybrid arrangement' line of Table 2. As shown, diffraction efficiency above 85% may be achieved, and the range having similarly high diffraction efficiency is relatively wide; this provides a high tolerance regarding the machining (line formation) on the entry plane of the LN crystal. The profile depth h corresponding to the high efficiency range is smaller than the lattice constant $d_2$, and the filling factor f is close to 50%, which values are also advantageous regarding the machining. Moreover, the lattice constant of 0.639 µm (line-density of 1564/mm) of the grating to be formed in the LN crystal is also under the about 2000/mm threshold value, which also guarantees that the contact grating is practically realizable.

Figure 5:
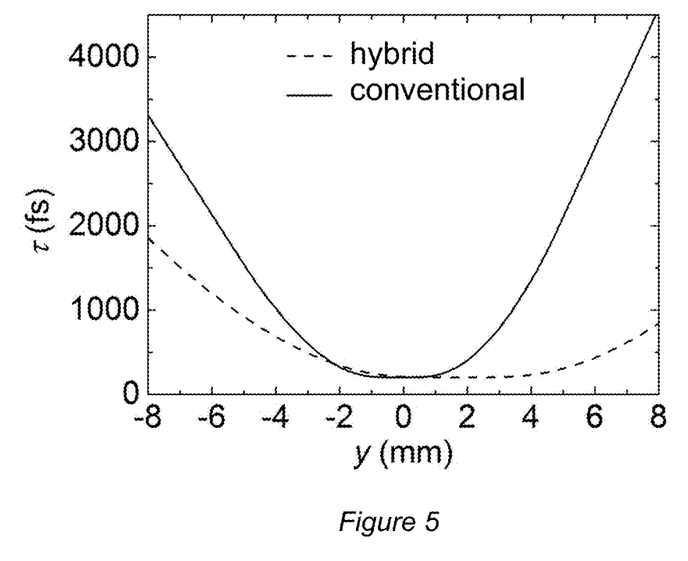
FIG. 5 shows changes in pulse length ($\tau$) in a transversal direction (y) perpendicular to the propagation of the pump beam due to imaging errors of a hybrid generation arrangement according to the invention implemented with a contact grating etched into the surface of, in particular, an LN crystal and of a corresponding conventional generation arrangement.

According to the aforementioned, the efficiency of THz beam generation is significantly affected by the pulse length distortion of the pump pulse due to imaging errors. FIG. 5 illustrates this for an optimized conventional arrangement and a hybrid generation arrangement. The local pulse length change ($\tau$) caused by the imaging errors is shown in the plane of angular dispersion transversally (y) along the beam diameter. The two curves clearly show the advantage of the hybrid arrangement according to the invention versus the conventional one, as the extent of pulse length expansion is significantly lower in the case of the hybrid arrangement. It can also be seen from the curves that for the hybrid arrangement, the pulse length remains below 500 fs everywhere in the beam even for beam diameters exceeding 10 mm, while for the conventional arrangement, the pump beam becomes longer than 1000 fs at the edge of the beam.

Due to inducing the tilt of the pulse front is carried out in two different steps, creating high quality grating profile with the lower line-density (at most 2000/mm) that can be used in the LN crystal does not cause a manufacturing problem. Furthermore the significantly reduced imaging errors due to the use of the hybrid generation arrangement improves the efficiency of THz beam generation, and the quality and focusability of the generated THz beam is better than what could be obtained by a conventional generation arrangement.

Besides the more efficient THz beam generation, a further advantage of the hybrid generation arrangement is that in the case of LN crystal, the exit plane of the THz generating prism forms an angle with the entry plane that is significantly smaller (~30°) than in the case of a conventional solution (~63°). This is advantageous for the intensity distribution of the THz beam. A further advantage is that THz beam generation of high efficiency is possible in a generation arrangement which does not contain/require refractive index matching liquid.

The invention claimed is:

1. A method to generate terahertz radiation in a nonlinear optical medium, the method comprising:
   subjecting a pump pulse to pulse front tilting to obtain a tilted pump pulse having a tilted pulse front;
   coupling the tilted pulse front into the nonlinear optical medium; and
   generating a THz pulse using the optical medium in nonlinear optical processes,
   inducing said pulse front tilt of the pump pulse to satisfy a velocity matching condition of $v_{p;cs}\cos(\gamma)=v_{THz;f}$ as a sum of a plurality of the pulse front tilts, each of the plurality of the pulse front tilts induced separately as a partial pulse front tilt of a same sense of the pump pulse in subsequent steps,
   wherein $v_{p;cs}$ is a group velocity of the pump pulse, $vTH_{z;f}$ is a phase velocity of the THz pulse, and $\gamma$ is an angle formed between the pulse front and the phase front of said pump pulse.

2. The method according to claim 1, further comprising inducing a first partial pulse front tilt of the pump pulse by guiding the pump pulse on a first optical element having an angular-dispersion-inducing property, and then by guiding the pump beam leaving the first optical element onto an imaging optics.

3. The method according to claim 2, further comprising inducing further partial pulse front tilts of the pump pulse by guiding the pump pulse having the partial pulse front tilt with the imaging optics via coupling into the nonlinear optical medium by a contact grating being in optical coupling with the nonlinear optical medium or formed on an entry plane of the optical medium.

4. The method according to claim 1, wherein the pump pulse is a laser pulse in the visible, near- or mid-infrared domain having a length of at most several hundred femtoseconds.

5. The method according to claim 1, wherein the first optical element is a diffraction based optical element or a refraction based optical element or an optical element that is a combination thereof.

6. The method of claim 1 wherein the generating the THz pulse by the pump pulse using the optical medium in nonlinear optical processes comprises using optical rectification.

7. A terahertz radiation source, comprising
   a pump source configured to emit a pump pulse;
   a nonlinear optical medium configured to generate a THz pulse,
   a first optical element having an angular-dispersion-inducing property;
   at least one further optical element with an angular-dispersion-inducing property; and
   an imaging optics,
   wherein the pump source and the nonlinear optical medium define together a light path, said light path being arranged to guide the pump pulse from the pump source to the nonlinear optical medium, and wherein the first optical element and the imaging optics are arranged in said light path after each other in a propagation direction of the pump pulse,
   wherein the at least one further optical element is provided within said light path, said at least one further optical element located after both the first optical element and the imaging optics in the propagation direction of said pump pulse.

8. The radiation source according to claim 7, wherein the at least one further optical element with angular-dispersion-inducing property comprises a single contact grating arranged at an entry plane of the nonlinear optical medium bordering the light path.

9. The radiation source according to claim 8, wherein contact grating is formed in a material of the nonlinear optical medium.

10. The radiation source according to claim 7, wherein the first optical element is selected from a group comprising diffraction based optical elements, refraction based optical elements, and optical elements constructed as a combination thereof.

11. The radiation source according to claim 10, wherein the first optical element is a transmissive optical grating.

12. The radiation source according to claim 7, wherein the imaging optics is selected from the group comprising imaging optics having any one of a lens, a refracting telescope, a mirror, a reflecting telescope, and concave mirrors.

13. The radiation source according to claim 7, wherein the nonlinear optical medium is formed by a material having a nonlinear optical coefficient of at least 1 pm/V and different refractive indices in a terahertz frequency range and a visible domain.

14. The radiation source according to claim 7, wherein the nonlinear optical medium is formed by a lithium niobate ($LiNbO_3$) or a lithium tantalate ($LiTaO_3$) crystal.

15. The radiation source according to claim 7, wherein the pump pulse is a laser pulse in a visible, near—or mid-infrared domain having a length of at most several hundred femtoseconds.

16. A terahertz radiation source, comprising:
a pump source configured to emit a pump pulse;
a nonlinear optical medium configured to generate a THz pulse,
a first optical element having an angular-dispersion-inducing property;
at least one further optical element with an angular-dispersion-inducing property; and
an imaging optics,
wherein the pump source and the nonlinear optical medium define together a light path, said light path being arranged to guide the pump pulse from the pump source to the nonlinear optical medium, and wherein the first optical element and the imaging optics are arranged in said light path after each other in a propagation direction of the pump pulse,
wherein the at least one further optical element is provided within said light path, said at least one further optical element located after both the first optical element and the imaging optics in the propagation direction of said pump pulse,
wherein the at least one further optical element comprises a single contact grating arranged at an entry plane of the nonlinear optical medium bordering the light path.

17. The radiation source according to claim 16, wherein the single contact grating is formed in a material of the nonlinear optical medium.

18. The radiation source according to claim 16, wherein the first optical element is selected from a group comprising diffraction based optical elements, refraction based optical elements, and optical elements constructed as a combination thereof.

19. The radiation source according to claim 16, wherein the first optical element is a transmissive optical grating.

20. The radiation source according to claim 16, wherein the imaging optics is selected from the group comprising imaging optics having any one of a lens, a refracting telescope, a mirror, a reflecting telescope, and concave mirrors.

21. The radiation source according to claim 16, wherein the nonlinear optical medium is formed by a material having a nonlinear optical coefficient of at least 1 pm/V and different refractive indices in a terahertz frequency range and a visible domain.

22. The radiation source according to claim 16, wherein the nonlinear optical medium is formed by a lithium niobate ($LiNbO_3$) or a lithium tantalate ($LiTaO_3$) crystal.

23. The radiation source according to claim 16, wherein the pump pulse is a laser pulse in a visible, near—or mid-infrared domain having a length of at most several hundred femtoseconds.

* * * * *